United States Patent [19]

Baron et al.

[11] Patent Number: 4,961,630
[45] Date of Patent: Oct. 9, 1990

[54] LIQUID CRYSTAL DISPLAY WITH AUXILIARY PIXEL CAPACITANCE INTERCONNECTED THROUGH SUBSTRATE

[75] Inventors: Yair Baron, Southfield; Zvi Yaniv, Farmington Hills, both of Mich.

[73] Assignee: Ovonic Imaging Systems, Inc., Troy, Mich.

[21] Appl. No.: 323,701

[22] Filed: Mar. 15, 1989

[51] Int. Cl.$^5$ ................................. G02F 1/13
[52] U.S. Cl. .................... 350/333; 350/334; 350/336
[58] Field of Search ............ 350/333, 334, 336, 332

[56] References Cited

U.S. PATENT DOCUMENTS

| | | | |
|---|---|---|---|
| 3,966,302 | 6/1976 | Mikoda et al. | 350/334 |
| 4,431,271 | 2/1984 | Okubo | 350/334 |
| 4,624,529 | 11/1986 | Dorfman | 350/334 |
| 4,699,470 | 10/1987 | McLaughlin et al. | 350/334 |
| 4,728,175 | 3/1988 | Baron | 350/333 X |
| 4,736,229 | 4/1988 | Holmberg et al. | 357/4 |
| 4,761,058 | 8/1988 | Okubo et al. | 350/334 X |
| 4,810,060 | 3/1989 | Ukai | 350/334 X |
| 4,840,460 | 6/1989 | Bernot et al. | 350/333 |

FOREIGN PATENT DOCUMENTS

| | | | |
|---|---|---|---|
| 0028089 | 2/1980 | Japan | 350/336 |
| 0133529 | 7/1984 | Japan | 350/334 |

*Primary Examiner*—Stanley D. Miller
*Assistant Examiner*—Huy K. Mai
*Attorney, Agent, or Firm*—Kenneth M. Massaroni; Marvin S. Siskind

[57] ABSTRACT

A light influencing display including a pair of substrates between which at least one pixel having a pixel capacitance and an auxiliary pixel capacitance in parallel with said pixel capacitance is formed. At least one via is etched through at least one of said substrates so aso to facilitate electrical communication between electrical components of the pixel disposed on the spacedly disposed substrates.

28 Claims, 3 Drawing Sheets

LIQUID CRYSTAL DISPLAY WITH AUXILIARY PIXEL CAPACITANCE INTERCONNECTED THROUGH SUBSTRATE

FIELD OF THE INVENTION

The present invention relates generally to liquid crystal displays and more particularly to liquid crystal displays which include an array of picture elements or pixels formed between a pair of substrates, each of said substrates associated with a first and a second electrode, respectively, with liquid crystal material operatively disposed therebetween. It is these oppositely disposed electrodes and the dielectric liquid crystal material therebetween which give rise to an inherent pixel capacitance. The present invention still more specifically relates to liquid crystal displays which are fabricated so as to provide an auxiliary capacitance electrically connected in parallel with the aforementioned inherent pixel capacitance. By providing a series of vias through at least one substrate of said display, it is possible to fabricate a display having electrical communication between one of said pixel electrodes and the auxiliary capacitance electrodes, while reducing the number of processing steps for the fabrication of displays having auxiliary capacitance.

BACKGROUND OF THE INVENTION

There are increasingly numerous applications wherein light influencing displays can be usefully employed. For example, light influencing displays are used to replace cathode ray tubes, as avionic information displays, as displays for digital watches, digital clocks, calculators, portable television receivers and a virtual plethora of other consumer related products.

Light influencing displays can be formed in many differing configurations using a number of different types of light influencing materials. As used herein, the term "light influencing material" is defined to mean any material which either emits light or which can be used to selectively vary the intensity, phase, direction, or polarization of light either being reflected from or transmitted through the material. Liquid crystal material is only one such material which exhibits the aforedescribed characteristics.

Generally, a liquid crystal display contains a plurality of pixels (picture elements), wherein each pixel includes a pair of electrodes (which are individually addressable by way of independent address means), and liquid crystal material disposed between the electrodes. When a voltage which exceeds the threshold voltage of the liquid crystal material is applied across the electrodes, the optical properties of the liquid crystal material switch. That is, the optical or physical properties change to provide either a light or dark display, the brightness of the display depending on the type of material used and the mode of operation of the display.

Liquid crystal materials can generally be triggered or switched by a relatively low threshold voltage. For this reason early non-active matrix pixel arrays suffered from "false positive" electrical charges, a condition in which static and background electrical charges exceed the threshold voltage of a given pixel, thereby causing unintended switching of the liquid crystal material. In this manner, a display signal may be generated when said pixel was not actually being addressed.

To alleviate the problems of background noise and cross-talk between adjacent pixels, various workers in the field, including the present inventors, have found it necessary to isolate pixel electrodes by interposing isolation devices between the pixel address means and at least one of the electrodes thereof. These isolation devices can take the form of photoresistors, thin film transistors, diodes, and a variety of other types of current blocking devices. The isolation devices are adapted to block the flow of electrical signals below a predetermined threshold voltage. Once the threshold voltage is exceeded, current flows through the isolation device, thereby charging the electrodes of the pixel and switching the liquid crystal material disposed therebetween.

Typically, liquid crystal displays are fabricated so as to include a large number of pixels arranged in an $m \times n$ matrix of rows and columns. Because it is necessary to employ a large number of pixels in the matrix in order to form a high resolution, large area display, multiplexing techniques are used to selectively address each pixel thereof. To that end, each of the pixels in a row are coupled together by a row address line. Likewise, each of the pixels in a column are coupled together by a column address line. In this manner, each pixel is electrically located at a unique intersection of two address lines (a row address line and a column address line) and is adapted to be individually addressed by applying a voltage potential across those two intersecting address lines.

A "passive" matrix is defined in the art as a matrix where the pixel electrodes are directly coupled to the address lines. In a passive matrix, the inherent voltage threshold characteristic of the display material is relied upon to selectively actuate of only those pixels which are addressed with a potential greater than the threshold voltage. However, in such a matrix system, pixels can experience an increased potential, which increase is due to the fact that they are coupled to one of the address lines to which the potential was increased; but said pixels may not be activated because the potential increase is below the threshold voltage necessary to switch the liquid crystal material of the pixel. A pixel will only be activated when the potential across the electrodes thereof is above the threshold voltage, i.e., when both address lines are energized. Further, it is well known that the number of pixels which can be employed in passive matrix liquid crystal displays have contrast and speed limitations, which are both dependent, in part, on the finite sharpness of the threshold voltage characteristics of the liquid crystal material.

In order to achieve high resolution, high contrast and high speed in liquid crystal displays having a large number of pixels, active matrix displays must be used. Active matrix displays, as discussed hereinabove, employ one or more isolation devices at each pixel so as to provide improved threshold voltage sharpness at each pixel, thereby enhancing isolation between the pixels electrically connected to common address lines. A number of different types of terminal isolation devices have been used to provide the required isolation. As used herein, the term "isolation device" will refer to any device which enhances the ability of one pixel to be addressed (switched) without switching or adversely affecting other pixels sharing a common address line. Such isolation devices include threshold devices, for example, one or more diodes arranged in various configurations, M-I-M structures, photoresistors, thin film transistors and other current control devices.

Some two terminal isolation devices, such as diodes and certain configurations of three terminal devices are single polarity (unipolar) devices. That is, single polarity devices can be turned on in only one direction or polarity. Other two terminal devices, such as diode rings, M-I-M (metal-insulator-metal) devices, n+-i-n+ threshold isolation devices, and otherwise configured three terminal devices, such as thin film transistors, are dual polarity (bipolar) devices which can be turned on so as to conduct current in either one of two directions therethrough.

All of these isolation devices provide a more precise voltage threshold then that provided by the light influencing material itself. A precise voltage threshold results in a smaller variance in the voltage required to switch a pixel from an "off" condition to an "on" condition. Since isolation devices significantly reduce, if not totally eliminate the effects of "cross talk" and "noise", thereby providing for a greater number of pixels to be addressed by any given address line.

Liquid crystal displays which can be manufactured with high yields, utilizing diodes as the isolation devices are disclosed in commonly assigned, co-pending U.S. patent application Ser. Nos. 573,004 and 675,941 each entitled "Liquid Crystal Displays Operated By Amorphous Silicon Alloy Diodes", and filed in the names of Zvi Yaniv, Vincent D. Cannella, Gregory L. Hansell and Louis D. Swartz, on Jan. 23, 1984 and Dec. 3, 1984, respectively, which applications are incorporated herein by reference. As disclosed therein, the diodes, employed as switching devices, can be formed with reduced precision photolithography and with significantly fewer process steps then required to form other types of isolation devices, such as transistors.

The displays disclosed in the aforementioned co-pending U.S. Applications rely upon the inherent pixel capacitance to provide charge retention and maintain a pixel in a desired optical condition. As mentioned hereinabove, pixel capacitance results from the capacitance created by a pair of charged electrodes having liquid crystal material disposed therebetween. Inherent pixel capacitance, relative to the overall conductance of the light influencing material (and any other leakage paths) available to discharge the stored charge, determines the length of time a desired voltage above the minimum threshold voltage level can be held across the liquid crystal display material of a pixel (the pixel time constant). It is in this manner, that the pixel is maintained in a high voltage optical condition after the potentials are applied and during the time in which the other pixels of the display are addressed. However, it is desirable that the total capacitance of the pixel be increased so that leakage paths which can slowly discharge the pixel are insufficient to initiate readings of the presence of false optical conditions existing across at least some picture elements.

Adding additional or auxiliary capacitance to increase the total amount of charge which may be stored prior to discharge (i.e., to increase the time for pixel self discharge) is difficult. This is because the added capacitance must be applied electrically in parallel with the pixel capacitance across the electrodes, requiring an electrical connection through the liquid crystal material (which separates those electrodes). The addition of auxiliary capacitance is further structurally complicated by the fact that displays are usually electrically and structurally equipped with addressing circuitry on both electrode planes.

An improved active matrix display having all of the addressing electronic circuitry, including isolation devices on one substrate or pixel electrode plane of the display, is disclosed in U.S. patent application Ser. No. 4,589,733 entitled "Displays In Sub-Assembly Having Improved Pixel Electrodes", issued on May 20, 1986 in the names of Zvi Yaniv, Yair Baron, Vincent D. Cannella and Gregory L. Hansell, the disclosure of which is incorporated herein by reference. The displays disclosed by Yaniv, et al include a plurality of pixels, with each pixel including a first electrode having a pair of spaced apart side-by-side electrode portions on a first electrode plane and a second electrode spaced from and facing the first electrode portions on a second electrode plane. The second electrode is electrically insulated from all external circuit connections and from all other pixel electrodes. Liquid crystal material is disposed between the first electrode portions and the second electrode. Displays of this type exhibit decreased electronic complexity because all of the addressing lines are formed on the first electrode plane i.e., the electrode plane carrying first pixel electrode. In accordance with the preferred embodiment, the address lines are coupled to each portion of the first electrode by one or more devices which are adapted to provide pixel isolation.

An improved display is disclosed in commonly assigned and co-pending U.S. patent application Ser. No. 639,001, filed Aug. 8, 1984 in the name of Vincent D. Cannella for "Displays And Sub-Assemblies Having Optimized Capacitance", the disclosure of which is incorporated herein by reference. As disclosed therein, an auxiliary pixel capacitance is provided by the addition of a third auxiliary capacitance electrode. The third auxiliary capacitance electrode is spaced from and faces the first electrode portions on the side of the first electrode opposite the liquid crystal display material. The third, auxiliary capacitance electrode provides an auxiliary capacitance that is in parallel with the inherent pixel capacitance. In this manner, the capacitances, being in parallel, add and the total pixel RC time constant can be materially increased. Commonly assigned U.S. Pat. No. 4,728,802, filed Oct. 9, 1986, and issued Mar. 1, 1988 in the name of Yair Baron for "Liquid Crystal Display Having Pixels With Auxiliary Capacitance", the disclosure of which is incorporated herein by reference, provides a larger auxiliary capacitance disposed electrically in parallel with the pixel capacitance in a given display.

However, the effectiveness of providing the aforedescribed auxiliary capacitance is limited by the ability to effectively and reliably interconnect the auxiliary capacitance electrode in parallel with the inherent pixel capacitance. Heretofore, attempts to interconnect the auxiliary capacitance electrode with the pixel have been hampered by the space constraints presented by operating between the sheets of substrate. These constraints often resulted in shorts and other performance degrading defects. It is to the end of economically and reliably interconnecting auxiliary capacitance in electrical parallel with the pixel capacitance that the instant invention is directed.

BRIEF SUMMARY OF THE INVENTION

The present invention provides a liquid crystal display and a method for the fabrication of liquid crystal displays which include an auxiliary capacitance disposed electrically in parallel with the inherent pixel capacitance so as to increase the RC time constant of the pixel. In order to accomplish this increase in pixel capacitance, electrical contact connections are formed through the second or top substrate material and outside the display, thereby facilitating electrical communication between the upper electrode of a given pixel and the auxiliary capacitance thereof. In this manner, the auxiliary capacitance is placed electrically in parallel with the inherent pixel capacitance, (which capacitance is attributable to both the liquid crystal material and electrode resistance).

The fabrication of the improved displays of the instant invention includes the formation of a via through the sheet of substrate material upon which the upper electrodes of the LCD is fabricated. This via provides for electrical interconnections to be effected through the plane of the upper substrate, thereby simplifying the establishment of electrical communication between an electrode disposed upon the upper substrate and an auxiliary capacitance electrode formed upon the lower substrate. This improvement is necessary because the narrow space which exists between the planes of the spaced upper and lower substrates inhibits the formation of electrical interconnections therebetween. However, by effecting electrical interconnections to and through the one of the planes of the substrate, the requirement of providing for electrical connection through, for example, the body of the liquid crystal material lying therebetween has been obviated. This is made possible through the use of controllably etchable glass through which vias can be made, so as to interconnect electronics on the upper substrate with electronics operatively disposed on the lower substrate.

More specifically, the instant invention encompasses an improved light influencing liquid crystal display which includes at least one pixel disposed between a first substrate and a second substrate, wherein at least one of said substrates is transparent. The display includes first and second sets of address lines which are adapted to selectively address the electrodes of said pixel; the first pixel electrode is formed from a layer of transparent, electrically conductive material deposited on said first substrate and the second electrode is formed from a layer of transparent, electrically conductive material deposited upon said second substrate. A layer of light influencing material, such as a nematic liquid crystal material is disposed between said first and second electrodes, which material, when taken in combination with the spaced electrodes of the pixel, possess an inherent pixel capacitance. An electrical isolation device, usually in the form of one or more diodes or TFT's, is interposed between one of the electrodes of the pixel and one of the two sets of address lines associated with that electrode. At least one via is formed through either the upper or lower substrate material, which via is adapted to facilitate electrical communication between the auxiliary capacitance and the second electrode of the pixel.

In a preferred embodiment of the present invention the second or auxiliary capacitance is created by a third or auxiliary capacitance electrode, which electrode is deposited directly upon the first, lower substrate and is equipped with auxiliary address lines adapted to establish electrical communication between each of the auxiliary electrodes in a given column of pixels, (as in a display formed by an m×n matrix of pixels). The auxiliary capacitance electrode, (like the first and second electrodes) is preferably formed of a transparent, electrically conductive material such as indium oxide, tin oxide, indium tin oxide, zinc oxide, cadmium stannate and combinations thereof. After formation, the third electrode is completely covered by an electrically insulating material such as silicon carbide, silicon nitride, or silicon oxide. The auxiliary capacitance electrode is thus buried beneath an insulating layer which also serves as the deposition surface for a first electrode which is subsequently deposited thereupon. The first electrode is deposited atop the insulating layer employing a method similar to the method employed in the deposition of the auxiliary capacitance electrode. Further, the first electrode may be of a substantially similar size and shape as said auxiliary capacitance electrode.

The first electrode is selectively addressed by first address means, including a row select driver, which is adapted to apply an operating potential of a magnitude equal to at least a threshold voltage to the first electrode so as to cooperate with a column select driver to affect a change in the liquid crystal material. At least one isolation device is provided between said pixel and said first address means to block undesired electrical signals due to "cross-talk" or background noise from affecting an erroneous change in said pixel. Thus, either or both of the row and column select drivers, when taken in combination, must be capable of applying an operating voltage sufficient to exceed the threshold voltage of the isolation device in order to charge said pixel. While the isolation device is typically a diode, many other devices may be employed without departing from the spirit or scope of the present invention. Examples of such devices include, without limitation, photoresistors, thin film transistors, M-I-M devices and ring diodes.

The second electrode, operatively disposed upon the second substrate, is formed by a deposition process similar to that employed for the deposition of said first and auxiliary capacitance electrodes. Further, said second electrode is addressed by a column select driver, which driver is adapted to apply an operating potential thereto. The column select driver is in electrical communication with the auxiliary capacitance address lines so as to apply thereto, an operating potential equal in magnitude to that which is applied to the second electrode, thereby establishing an auxiliary capacitance in parallel to said pixel capacitance. As a result of the addition of the auxiliary capacitance which affects a larger RC time constant, it is possible to reliably maintain a given pixel in a desired optical condition, over a longer period of time.

As was previously mentioned, heretofore the use of an auxiliary capacitance electrode in a liquid crystal display has been cumbersome, due to the difficulty associated with establishing electrical contact between the second pixel electrode and the auxiliary capacitance electrode. The present invention alleviates this problem by forming a via through the upper substrate for each column of pixels in the matrix of the liquid crystal display. Each of this series of via's is essentially an aperture of a preselected size and shape, formed adjacent a terminal edge portion of and etched through the second substrate. Preferably, each of the vias is formed adjacent the edge of the second substrate nearest the column select driver. Each of said vias is operatively disposed in contact with one of the second address lines so that electrical communication can be established, through the vias, with the auxiliary capacitance address means. The interior diameter of the via is plated with a layer of an electrically conductive material, such as an electrically conductive metal or a transparent, conductive oxide material.

It is to be noted that the two substrates are operatively disposed opposite one another in a substantially parallel relationship, so that each first electrode on the first substrate is spacedly disposed, aligned, and facing a corresponding second electrode on the second substrate. Thus, the second set of address lines are facing the first, lower electrode, interiorly of the pixel. The via allows electrical interconnection between one of the address lines of the second set of address lines and the corresponding column of auxiliary capacitance electrodes to be effected outside the substrates which together form the liquid crystal display. Thus, problems with shorts are avoided.

Other aspects, features and advantages of the present invention will become apparent from the subsequent Drawings, Detailed Description, and Claims appended hereto.

DETAILED DESCRIPTION OF THE INVENTION

Figure 1A:
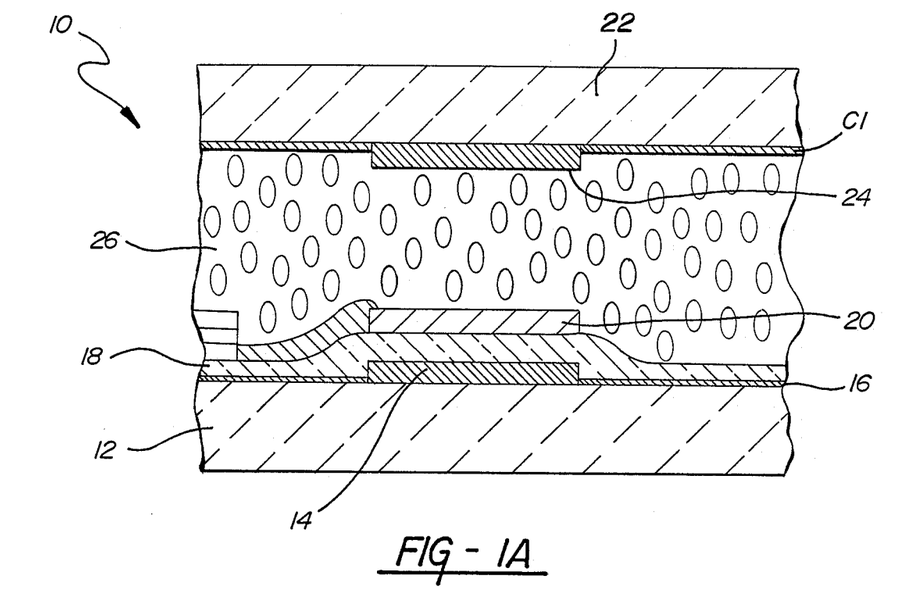
FIG. 1A is a partial cross-sectional representation of a single pixel of a light influencing display, said pixel including an auxiliary capacitance electrode operatively disposed electrically in parallel therewith.
Figure 1B:
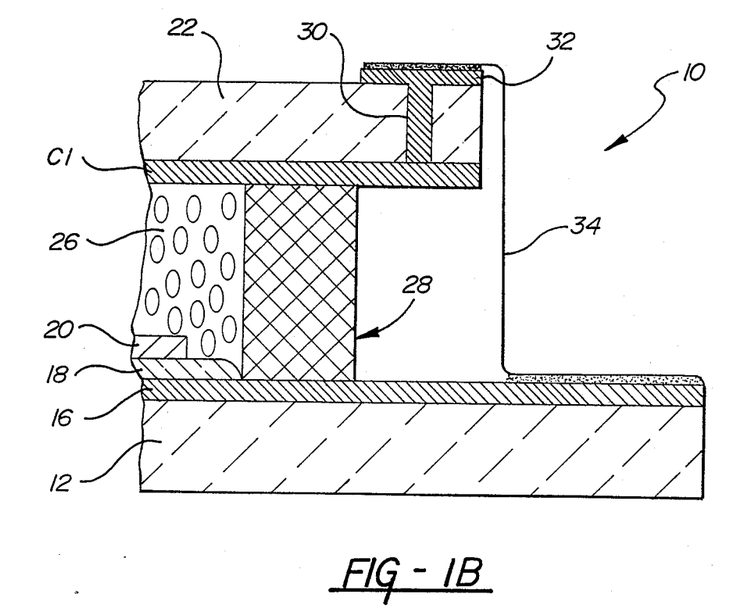
FIG. 1B is a partial cross-sectional representation of the light influencing display of FIG. 1A illustrating one of a plurality of vias, coated with electrically conductive material, formed through the upper substrate of the display so as to facilitate electrical communication between said auxiliary capacitance electrode and the corresponding second pixel electrode.

Turning now to FIGS. 1A and 1B, there is depicted therein a partial, cross-sectional representation of one pixel of the light influencing display of the present invention, said display depicted generally by the reference numeral 10. Although only one pixel is illustrated in FIG. 1A any number of such pixels may be arranged in a matrix of columns and rows, to provide an m×n display of any desired size. It is to be noted that due to the constraints of two-dimensional representation, FIG. 1A is not a completely true representation of a pixel. In order to be more accurate it would be necessary to depict column address line $C_1$, and auxiliary capacitance address line 16 as being perpendicular to the plane of the drawing. A more accurate, albeit less detailed view of the display is provided in FIG. 3.

The pixel of display 10 is comprised of a first substrate 12 which is preferably formed of a transparent, electrically insulating material. In a preferred embodiment, the first substrate 12 is fabricated from glass of a relatively high optical quality, being substantially free from defects and inclusions. The size and shape of the substrate 12 is determined by the size and proposed use of the display 10.

Deposited upon said first substrate 12 is the auxiliary capacitance electrode 14, and auxiliary capacitance address line 16, preferably formed from a transparent, electrically conductive material. The electrode material may be selected from the group consisting of, but not limited to, indium tin oxide, indium oxide, tin oxide, zinc oxide, cadmium stannate and combinations thereof. Further, in applications where a reflective (rather than transmissive) mode is required, the auxiliary electrode material may be selected from the group consisting of, but not limited to, molybdenum, aluminum, chromium and combinations thereof. An insulating layer 18 is deposited atop the auxiliary capacitance electrode 14 and auxiliary capacitance address line 16 so as to completely cover them. The insulating layer electrically isolates the auxiliary capacitance electrode 14 and auxiliary capacitance address line 16 from any materials which may subsequently be deposited thereover. The layer of insulating material is a dielectric, typically selected from the group consisting of $SiO_x$, $SiN_x$, $SiC_x$, and combinations thereof.

Thereafter, the first pixel electrode 20 is deposited atop the layer of transparent, electrically insulating material 18. The material used for this first pixel electrode 20 is selected from that group of transparent electrically conductive materials listed hereinabove with reference to the auxiliary capacitance electrode 14. The first electrode 20, as will be further explained, is selectively addressed by first address lines $R_1$ and $R'_1$ (not shown) of FIG. 1 through isolation devices, such as partially illustrated current blocking diode 23, all of which are operatively disposed atop the layer of electrically insulating material 18.

The pixel 10 further includes a second substrate 22, also, preferably formed of a transparent, electrically insulating material such as glass. However, the glass from which the second substrate is fabricated must be controllably etchable to provide for the formation of a via, such as via 30 in FIG. 1B, therethrough. This may be accomplished through a doping process in which a controlled quantity of an ion, preferably K+, is added to the glass substrate material during the melting thereof as is known in the glass manufacturing art. Accordingly the second substrate 22 may be a soda-lime-silicon glass, e.g. an $SiO_2$—$Na_2O$—$CaO$—$Al_2O_3$ glass, optionally with $B_2O_3$ and/or MgO, or the like, to which has been added a large, reactive ion, as K+, which large, reactive ion is removed or exchanged after solidification to leave pores or a porous network within the glass substrate. Alternatively, the second substrate may be a borosilicate glass e.g., an $SiO_2$—$B_2O_3$—$Al_2O_3$—$Na_2O$ glass, optionally with one or more of CaO, BaO, ZnO, or the like, to which has been added a leachable, etchable, or exchangeable component during melting for subsequent removal to provide the pores, or porous network of the vias 30. The result of adding the ion to the molten glass is to make the region of glass so treated more susceptible to a fluorine gas etch process for the formation of the via 30 through said glass substrate. Said via 30 is formed through said second substrate material before any of the deposition processing begins.

Deposited upon the deposition surface of the second substrate 22, i.e., the surface facing the first electrode 20, is a second pixel electrode 24 and column address line $C_1$. This second electrode 24 is formed from a layer of transparent, electrically conductive material selected from the group described hereinabove with reference to said first pixel electrode 20.

The second substrate 22 is operatively disposed in substantially parallel relationship with the first substrate 12. In this manner, each of said first electrodes 20 are aligned with and disposed in a plane parallel to a corresponding one of said second electrodes 24. The distance between the first substrate 12 and the second substrate 22 is between 2 and 10 microns. A thin film or layer of a liquid crystal material 26 is interposed between the electrodes 20 and 24 in the space between the substrates 12 and 22. In a preferred embodiment of the instant invention, the liquid crystal material is a nematic or twisted liquid crystal display material, though one skilled in the art may appreciate that other liquid crystal materials may be used, such as guest-host, cholesteric nematic, dynamic scattering and chiral smectic materials.

Note that, as shown in FIG. 1B, adjacent the distal end of the opposing substrates 12 and 22, seal 28 of epoxy type glue is utilized to bond said first substrate 12 and second substrate 22 together. The seal 28 is further adapted to prevent said liquid crystal material 26 from seeping out from between the substrates.

Referring now specifically to FIG. 1B, there is illustrated therein the structure for providing electrical interconnection between the second electrode 24 of FIG. 1A, and column address line $C_1$ and the auxiliary capacitance electrode 14 and auxiliary capacitance address line 16 depicted in FIG. 1A. More particularly, at the end of each column of the top electrode of each pixel, a via 30 is formed. While FIG. 1B illustrates the end of the column of pixels depicted in FIG. 1A, it is to be understood that connections between the auxiliary capacitance address line and the column address line are provided at the terminal portion of each column of the m×n matrix.

As is readily apparent from a perusal of FIG. 1B, the via 30 is etched through the entire thickness of the second substrate 22 adjacent a terminal edge thereof, e.g. through a region of the substrate that does not have liquid crystal material 26 disposed therebelow, and in contact with one of the column address lines. The via 30 provides for the implantation of an electrically conductive grommet 32 which is adapted to establish electrical communication with said column address means $C_1$. This grommet 32 is in turn placed in electrical contact with, for example, a flexible, polymeric electrically conductive member 34 adapted to establish direct electrical communication with the auxiliary address line 16. By applying a potential to address means 16 and $C_1$, both a pixel capacitance and an auxiliary capacitance is established for each pixel in that column of the display 10. Alternatively, an electrically conductive material may be deposited or plated upon the side walls of the via 30 so as to form an electrically conductive, plated-through via for establishing electrical communication with said column address line. The flexible conductive member 34 may then be connected to the plated-through via to establish electrical contact with the auxiliary capacitance address line 16.

Figure 2:
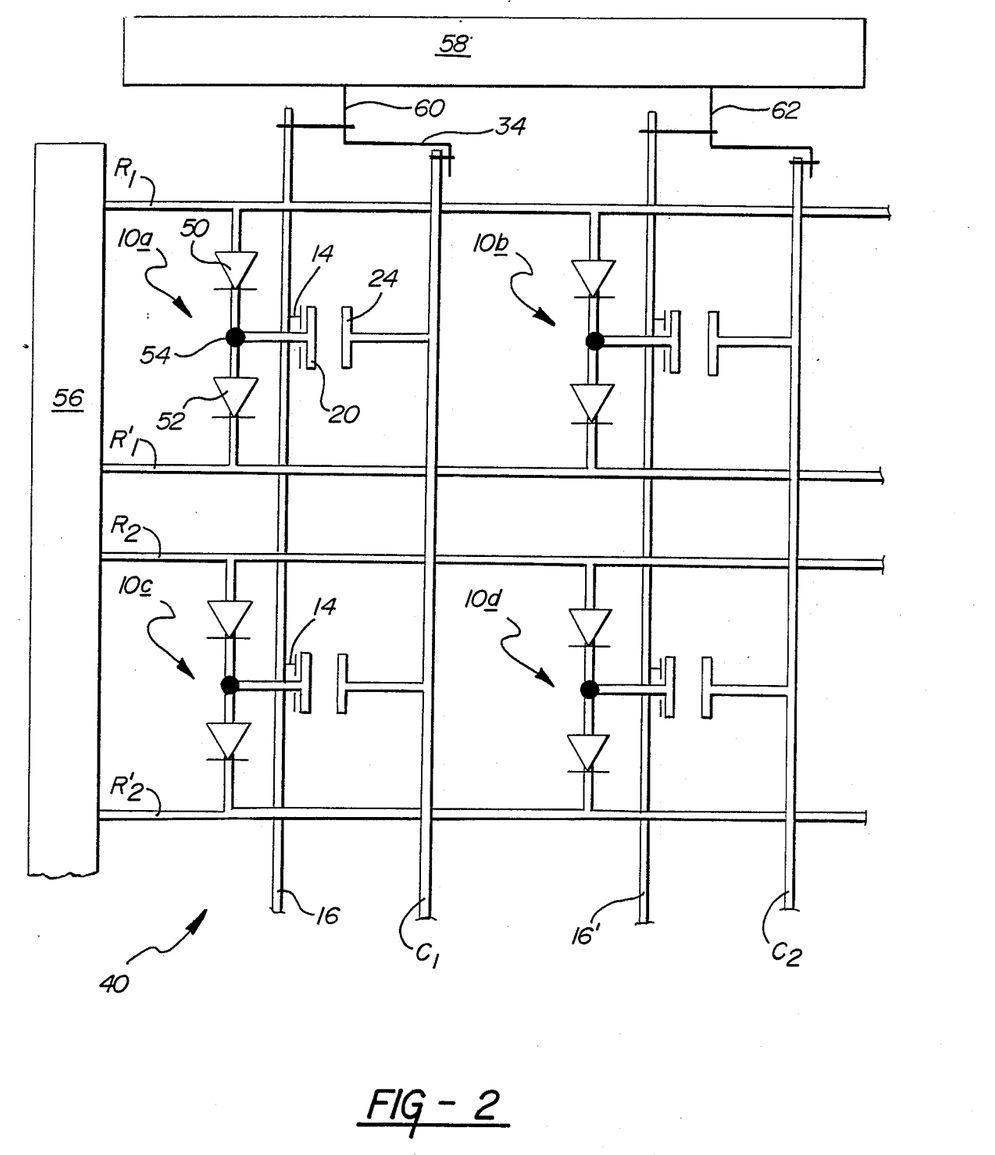
FIG. 2 is a schematic circuit diagram of a 2×2 matrix of a liquid crystal display, said matrix including auxiliary capacitance electrodes.

Referring now to FIG. 2 illustrated therein, in schematic circuit diagram form, is a liquid crystal display matrix 40, embodying a plurality of discrete pixels 10a, 10b, 10c, 10d including auxiliary capacitance electrode electrically interconnected with the second pixel electrode in the manner described. For purposes of illustration, the liquid crystal display matrix 40 takes the form of a 2×2 array, though it may be appreciated that a matrix could be any number of rows and columns, each row and column including a preselected number of pixels therein. The liquid crystal display matrix 40 includes a first address means comprising a plurality of row address line pairs R1, R1', R2 and R2' wherein each line in a given address line pair applies an operating potential to a pixel equal in intensity and opposite in polarity to the other line of the pair so as to place the first electrode of the pixels at a first operating potential. A plurality of column address lines C1 and C2 are operatively disposed in electrical communication with the second electrode 24 of each pixel in a given column of said display so as to place the second electrode of the pixels at a second operating potential. Finally, a plurality of auxiliary address lines 16 and 16' are operatively disposed to provide an electrical potential to the auxiliary capacitance electrode of each pixel in a given column of said display, said auxiliary capacitance electrode being provided electrically in parallel to the first and second pixel electrodes.

Since each of the pixels of the matrix 40 are fabricated so as to be substantially identical to one another, it is necessary to describe a single pixel, such as pixel 10a. The pixel 10a, as can be seen in FIG. 2, preferably includes at least one isolation device comprised of two blocking elements, such as a pair of isolation diodes 50 and 52, which diodes are coupled together in anode to cathode fashion at a common node 54. The isolation diodes 50 and 52 are coupled together in non-opposing series relationship between the row address line pair R1 and R1'. Although the blocking elements are illustrated and described with respect to diodes, it is to be understood that any blocking element which provides a high impedance to current flow when reverse biased or turned off and lower impedance to current flow when forward biased or turned on may be employed. Examples of other types of isolation devices which may be used with the present invention without departing from the spirit or scope thereof include bidirectional threshold devices, thin film transistors, MIM type devices, and ring diode arrangements. In accordance with preferred embodiments disclosed herein, the isolation diodes 50 and 52 are formed in a p-i-n configuration from thin film non-single crystal semiconductor materials such as amorphous silicon or amorphous germanium alloys.

The reference pixel 10a further includes a pair of spacedly disposed pixel electrodes 20 and 24. The first pixel electrode 20 is disposed in electrical communication with the common node 54 between isolation devices 50 and 52. The second pixel electrode 24 is disposed in electrical communication with said column address line C1. An inherent pixel capacitance is generated between each pair of said pixel electrodes 20 and 24, said pixel electrodes separated from one another by the layer of light influencing material 26 (not shown in FIG. 2).

One way by which it is possible to charge the reference pixel 10a is to provide a short duration, positive potential, which is applied along the row address line R1, and simultaneously a short duration negative potential along row address line R1'. Simultaneously, either a negative or positive or preferably alternating charge is applied along the column address line C1. A method for addressing a pixel, excluding auxiliary capacitance is fully disclosed in commonly assigned U.S. Pat. No. 4,731,610 entitled "Balance Drive Electronic Matrix System and Method of Operating Same" in the names of *Baron, et al*, the disclosure of which is incorporated herein by reference. Accordingly the details of the addressing technique need not be further described at this point, especially since the instant invention does not seek to reinvent the concept of auxiliary capacitance, but merely concerns an improved technique for electrically interconnecting pixel electrodes with auxiliary capacitance electrode.

In an active matrix display used, for example, as a computer monitor or a television set, all of the pixels of the display are typically refreshed or re-written (i.e. charged or discharged to the desired video voltage level) once during each frame. In monochrome displays having a 60 hertz refresh rate, the average frame period is 16.7 milliseconds. For certain full color displays successively representing three primary colors 60 times per second, the frame time of certain pixels may be ⅓ of 16.7 milliseconds.

Alternatively, the frame period may be significantly longer then the 16.7 milliseconds alluded to above provided that the pixels of the display are capable of retaining a sufficiently high portion of their charge. It is for the purpose of maintaining the level of storage of charge in pixels between refresh times that the pixel 10a has been fabricated so as to include an auxiliary capacitance 14 which is disposed in parallel with the inherent pixel capacitance. In this manner the total capacitance of the pixel becomes the capacitance of the liquid crystal material plus the capacitance of the auxiliary electrode. As disclosed herein, the auxiliary capacitance electrode 14 is spaced, insulated from, and facing the first electrode 20. The auxiliary capacitance electrode 14 of FIG. 2 is electrically coupled in parallel with the inherent pixel capacitance (established between the first pixel electrode 20 and the second pixel electrode 24) by means of a flexible electrically conductive member 34 which establishes electrical contact between said auxiliary pixel capacitance electrode 14 and said second pixel electrode 24. Electrically coupling the auxiliary capacitance electrode 14 directly to the column address line Cl provides for a significant increase in the magnitude of the auxiliary capacitance which is thereby added in parallel to the inherent capacitance of pixel 10a.

The liquid crystal display 40 of FIG. 2 is electrically driven by a row select driver 56 and a column select driver 58. Row select driver 56 is adapted to provide electrical impulse drive signals at the multiple outputs thereof to row address lines R1, R1', R2, and R2', respectively. The electrical impulses apply first operating potentials to the isolation devices disposed about common node 54 of pixel 10a being addressed. This electrical impulse facilitates the storage or discharge of an electrical charge placed across the electrodes of a pixel. The row select driver 56 also applies a second operating potential to reverse bias or turn off the isolation devices and thus prevent loss of stored charge on the pixel 10a.

The column select driver 58 is adapted to provide electrical impulse drive signals at the multiple outputs 60 and 62 thereof. As shown in FIG. 2, column outputs 60 and 62 are in electrical communication with auxiliary capacitance address lines 16 and 16' and column address lines C1 and C2, respectively. A potential applied to output 60 is conducted equally along both auxiliary capacitance address line 16 and column address line C1, (similarly, a potential applied at output 62 is conducted along column address line C2 and auxiliary capacitance address line 16') thereby establishing two capacitances at pixel 10a; one between electrodes 20 to 24, and one between auxiliary capacitance electrode 14 and electrode 20. The advantages of said auxiliary pixel capacitance added to the inherent capacitance having been discussed previously hereinabove.

Figure 3:
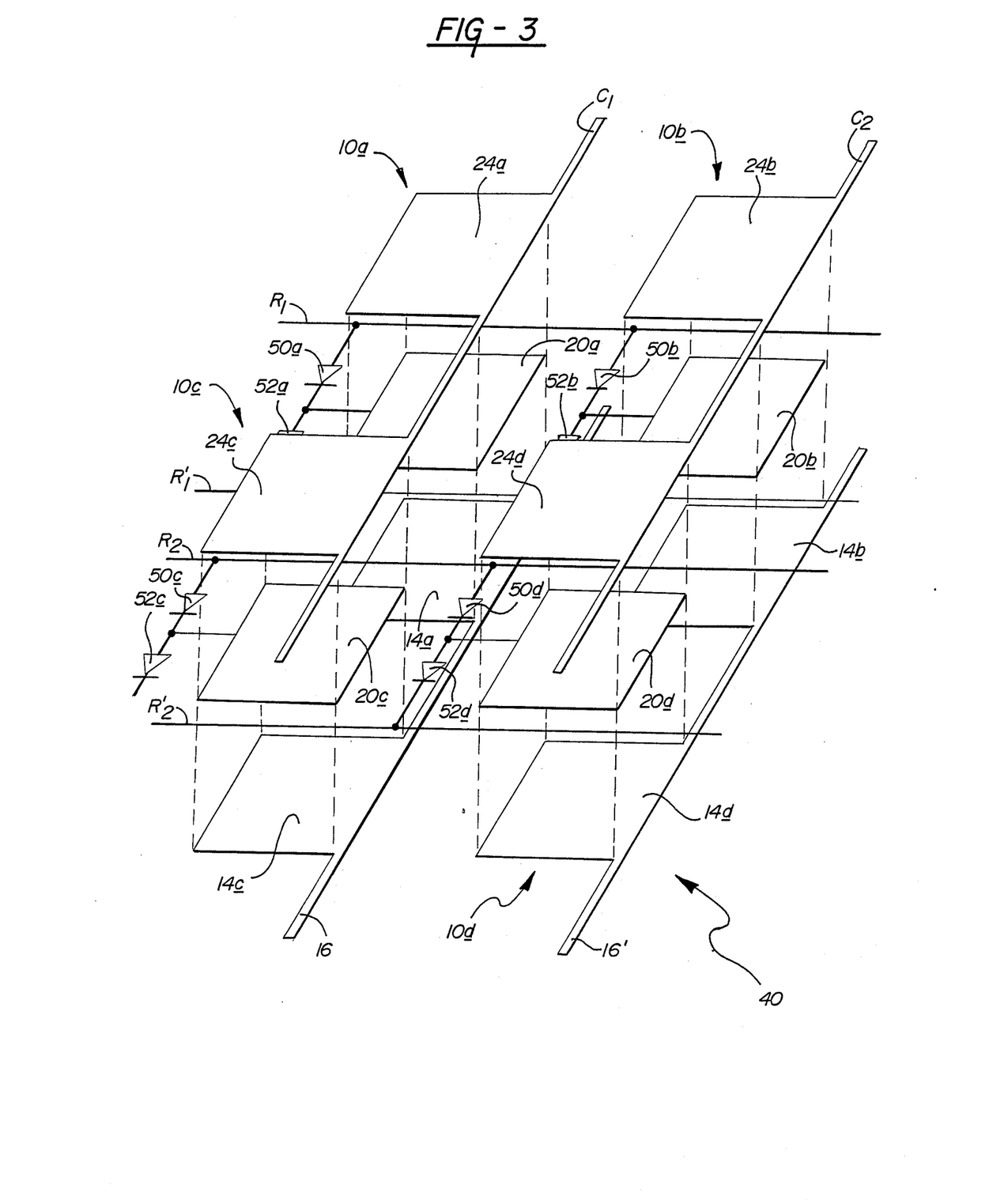
FIG. 3 is a stylized, partial perspective view of the liquid crystal display matrix illustrating the manner in which the pixel upper electrodes and the auxiliary capacitance electrodes are electrically interconnected.

Turning now to FIG. 3, there is depicted therein, in perspective form, the liquid crystal display matrix 40 schematically illustrated in FIG. 2. Specifically, there is shown therein, a matrix of 2 rows and 2 columns including pixels 10a, 10b, 10c and 10d. There are three distinct, substantially parallel planes of electrodes. The first, lowermost plane illustrated herein is the plane of auxiliary capacitance electrodes 14a, 14b, 14c and 14d; said electrodes being deposited, along auxiliary capacitance address lines 16 and 16', upon the surface of a first substrate (not shown). It is to be noted that, as described hereinabove, there is deposited above said first plane of auxiliary capacitance electrodes, the layer of electrically insulating material which is adapted to isolate said subjacent plane of auxiliary electrodes from the superjacent plane of first electrodes. The first electrode plane is substantially parallel to the auxiliary electrode plane and includes the first pixel electrodes 20a, 20b, 20c and 20d and row address line pairs R1 and R1' and R2 and R2', all of which are deposited upon the layer of insulating material. Also deposited upon the layer of insulating material and disposed in said first electrode plane are said isolation devices, 50a, 50b, 50c, 50d and 52a, 52b, 52c, 52d. The isolation devices are depicted as diodes (preferably p-i-n type amorphous silicon diodes) arranged in non-opposing series relationship (anode to cathode connected), though as hereinabove described the isolation devices may be formed as other current control devices.

The plane of the third electrodes is substantially parallel to the plane of the first pixel electrodes and includes the second pixel electrodes 24a, 24b, 24c and 24d along with said column address lines Cl and C2. The third electrodes and column address lines are preferably fabricated upon said second substrate (not shown in FIG. 3). As can be appreciated from the perspective drawing of FIG. 3, three parallel planes of pixel and auxiliary electrodes are provided in substantially parallel relationship. Further, and as disclosed hereinabove, there is disposed between the second and third electrodes a layer of liquid crystal material of the type previously specified. It has been discovered by the present inventors that by arranging the plurality of electrode planes in the manner disclosed, and by applying potentials to the various address lines to charge those electrodes in the manner previously described, the pixels of a liquid crystal display may be charged and retain that charge so as to obtain superior display performance.

As a result of placing the auxiliary capacitance of a pixel in parallel to the inherent pixel capacitance, liquid crystal displays utilizing the m × n matrix pixel structure disclosed herein exhibit many advantages over conventional pixel structures using only two pixel electrodes sandwiching the light influencing material therebetween to develop a single inherent pixel capacitance.

First, the pixels disclosed herein are much less affected by the "capacitive kick" phenomena than are pixels of conventional design. "Capacitive kick" refers to the transfer of charge between the pixel capacitance and the capacitance of the isolation devices. It occurs at the end of a refresh period of a pixel address cycle. Specifically, "capacitive kick" occurs at a point in the pixel address and read cycle when the isolation device is switched from its conductive or forward biased state to its off or reverse biased state. This switch in potential causes a relatively large voltage drop which results in a significant transfer of charge from the pixel capacitance to the capacitance of the isolation device. This "capacitive kick" adversely affects the ability of pixel to properly respond as desired to the driving potentials applied during the pixel refresh period.

The amount of charge removed from the pixel and transferred to the reverse biased isolation device depends upon the ratio of the isolation device capacitance and to the not inversely to the magnitude of the reverse bias to the inherent pixel capacitance. This problem grows more severe as this ratio is reduced, such as by reducing the overall size or surface area occupied by the pixels in order to increase pixel density to obtain higher resolution displays. However, the effect of capacitive kick is significantly reduced by the addition of the auxiliary capacitance to the inherent pixel capacitance in the manner described hereinabove. This additional capacitance permits the pixels of a liquid crystal display to be charged with greater accuracy; thus making more levels of gray scale possible, which additional levels of gray scale can be beneficially used to provide a higher quality image, free from grainy images and areas of low capacitance resulting in par contrast. Also, the auxiliary capacitance provides for the fabrication of higher resolution displays since it significantly reduces the capacitive kick problem.

The auxiliary capacitance also improves the ability of the discrete pixels of a display to maintain a potential above a predetermined threshold voltage across the electrodes thereof during any given time frame. As is well known, failure to maintain a voltage above the threshold voltage and preferably a relatively constant voltage across the electrodes of the pixels of a display may, and typically does, result in a visibly noticeable change in the amount of light being transmitted through, reflected, or scattered by the light influencing material. The quality of the image presented by the display is detrimentally effected, as by reduced contrast or, in the case of very slowly refreshed displays, by "flickering". Auxiliary capacitance increases the magnitude of the charge which can be stored across the electrodes of any pixel, correspondingly more time is required in which to discharge the pixel across the light influencing material. Therefore, it should be apparent that the additional capacitance improves the RMS voltage to peak voltage ratio experienced by the pixel.

A still further major advantage provided by the use of auxiliary capacitance is the ability of displays employing said auxiliary capacitance to correct for or largely prevent the serious problems posed to liquid crystal materials by relatively high temperatures. As is well-known, the resistivity of the liquid crystal material decreases with increasing temperature, and thus current leakage through liquid crystal material also increases with rising temperature. This has the effect of reducing the ability of the pixels of a liquid crystal display to capacitively maintain a given charge across the electrodes thereof at elevated temperatures. The result is that it is necessary to employ higher refresh video voltages and frequencies at elevated temperatures in order to avoid display fading, flickering or other degradation of the display image. However, the use of auxiliary capacitance eliminates the need for higher refresh frequencies. Thus, a liquid crystal display utilizing pixels equipped with auxiliary electrodes, as shown in FIG. 2, can operate at relatively low refresh frequencies, such as 40 hertz, even at temperatures of 60 degrees Centigrade or more without noticeable fading or flickering of the display image.

It is to be noted that the vias 30 which are formed through the thickness dimension of the second substrate 22 facilitate forming the electrical interconnection between the column address lines $C_1$ and the auxiliary capacitance address lines 16 of an $m \times n$ matrix of pixels 10 in a liquid crystal display 40. More particularly, by utilizing the via connection technique of the instant invention, it is possible to electrically interconnect column address lines on the second substrate with the auxiliary address lines on the first substrate without forming the electrical connect lead directly through the thickness of the liquid crystal display material interiorly of the active surface area of the $m \times n$ matrix of the liquid crystal display. Further, the connection can be made without consideration of the space constraints imposed by working between the first and second substrates, thereby substantially reducing the likelihood of short circuits.

Finally, it is possible to extend the column address lines $C_1$ and $C_2$ so as to be deposited upon the edge of, and wrap over to the top of the second substrate so as to provide a contact for effecting electrical communication between the auxiliary capacitance address line and the column address line.

As can be appreciated by those skilled in the art, the present invention can be practiced otherwise than as specifically disclosed herein. The figures and discussion herein are merely meant to illustrate the instant invention and not as a limitation upon the practice thereof. Accordingly, it is to be understood that the scope of the present invention is defined by the following claims and all equivalents thereof.

What is claimed is:

1. A light-influencing display, said display comprising:
   a first transparent substrate and a second, spacedly disposed transparent substrate;
   a first pixel electrode disposed upon said first transparent substrate;
   means for addressing said first pixel electrode, said first electrode addressing means disposed on said first substrate;
   a second pixel electrode disposed upon said second transparent substrate;
   means for addressing said second pixel electrode, said second electrode addressing means disposed on said second substrate;
   light influencing liquid crystal material disposed electrically in series between said first and second pixel electrodes;
   said electrodes and liquid crystal display material providing a first pixel capacitance between said first and second electrodes;
   means, spacedly disposed relative to the first and second pixel electrodes, adapted to provide an auxiliary pixel capacitance, said auxiliary capacitance means in parallel with said first pixel capacitance;
   at least one via formed through said second substrate, said via adapted to facilitate electrical communication between said second pixel electrode and said auxiliary capacitance means; and
   means electrically interconnecting said auxiliary capacitance means and said second pixel addressing means, said electrical interconnecting means extending through the via formed through the second transparent substrate.

2. A display as in claim 1, wherein said auxiliary capacitance means includes a third, auxiliary capacitance electrode operatively disposed upon said first substrate beneath said first electrode, said third electrode electrically isolated from said first electrode by a layer of insulating material.

3. A display as in claim 2, wherein the size and shape of said third, auxiliary capacitance electrode is substantially identical to the size and shape of said first electrode.

4. A display as in claim 3, wherein said third, auxiliary capacitance electrode is operatively disposed in a plane substantially parallel to the plane of said first electrode.

5. A display as in claim 2, wherein said layer of electrically insulating material is selected from the group consisting of silicon oxide, silicon nitride, silicon carbide, and combinations thereof.

6. A display as in claim 2, wherein said third, auxiliary capacitance electrode is fabricated from a deposited layer of transparent, electrically conductive material.

7. A display as in claim 6, wherein said layer of transparent, conductive material is selected from the group consisting of tin oxide, indium oxide, indium tin oxide, zinc oxide, cadmium stannate and combinations thereof.

8. A display as in claim 2, wherein said third, auxiliary capacitance electrode is electrically interconnected in series with a third, auxiliary capacitance electrode of an adjacent pixel through an auxiliary capacitance address line.

9. A display as in claim 8, wherein said auxiliary capacitance address line is formed upon said first substrate and is electrically insulated from said first electrode by said layer of electrically insulating material.

10. A display as in claim 8, wherein said second addressing means comprises at least one column address line electrically connected to said second pixel electrode.

11. A display as in claim 10, wherein said column address line is formed on said second substrate and substantially coplanar with said second pixel electrodes.

12. A display as in claim 11, further including a column select driver, said column select driver in electrical communication with said column address lines to apply an operating potential to a column of second pixel electrodes.

13. A display as in claim 12, wherein an auxiliary capacitance address line is electrically interconnected with said column address line and said auxiliary capacitance electrode.

14. A display as in claim 8, further including electrical contact means disposed upon the outer surface of said second substrate, said contact means extending through said via so as to electrically connect said column addressing lines and said auxiliary capacitance addressing line.

15. A display as in claim 14, wherein said electrical contact means is a flexible, electrically conductive member.

16. A display as in claim 15, wherein the first and second pixel electrodes establish a pixel capacitor, and wherein the electrical communication between said column address lines and said auxiliary capacitance electrodes provides a second capacitor, which the second capacitor is parallel to said pixel capacitor.

17. A display as in claim 1, wherein said first addressing means comprises at least a first set of row address lines.

18. A display as in claim 17, further including a row select driver, said row select driver in electrical communication with said row address lines, and adapted to apply an operating potential to a row of first pixel electrodes.

19. A display as in claim 1, wherein the first and second pixel electrodes are spacedly disposed in superposed relationship to one another.

20. A display as in claim 1, wherein the second substrate is fabricated from ionically treated glass so as to facilitate the selective etching of said vias therethrough.

21. A display as in claim 20, wherein said glass substrate is a soda-lime-silica glass to which there has been added reactive ions.

22. A display as in claim 1, wherein said via is formed through said second substrate adjacent a terminal edge portion thereof.

23. A display as in claim 1, wherein said via is formed by an etching process.

24. A display as in claim 1, further including at least a pair of series connecting blocking elements, said blocking elements electrically connected between a set of row address lines, said first pixel electrode electrically coupled between said pair of series connecting blocking elements.

25. A display as in claim 24, wherein said blocking devices are diodes.

26. A display as in claim 24, wherein said blocking devices are photoresistors.

27. A display as in claim 24, wherein said blocking devices are transistors.

28. A display as in claim 24, wherein said blocking devices are Schottky barrier diodes.

* * * * *